(12) United States Patent
Park

(10) Patent No.: US 7,159,131 B2
(45) Date of Patent: Jan. 2, 2007

(54) POWER CONTROL APPARATUS IN A DATA COMMUNICATION NETWORK, AND METHOD THEREFOR

(75) Inventor: Chong Heon Park, Suweon-si (KR)

(73) Assignee: LG-Nortel Co., Ltd., Seoul (KR)

( * ) Notice: Subject to any disclaimer, the term of this patent is extended or adjusted under 35 U.S.C. 154(b) by 590 days.

(21) Appl. No.: 10/282,024

(22) Filed: Oct. 29, 2002

(65) Prior Publication Data

US 2003/0084356 A1    May 1, 2003

(30) Foreign Application Priority Data

Oct. 29, 2001    (KR) ............... 2001-66680

(51) Int. Cl.
 *G06F 1/28*    (2006.01)
(52) U.S. Cl. ................... 713/310; 713/340
(58) Field of Classification Search ........... 713/310, 713/340
See application file for complete search history.

(56) References Cited

U.S. PATENT DOCUMENTS 5,652,893 A * 7/1997 Ben-Meir et al. ......... 713/310
5,842,027 A * 11/1998 Oprescu et al. ........... 713/300
6,027,515 A * 2/2000 Cimino ..................... 606/169

FOREIGN PATENT DOCUMENTS

JP    11331064 A  * 11/1999

* cited by examiner

*Primary Examiner*—Thuan Du
(74) *Attorney, Agent, or Firm*—Fleshner & Kim LLP.

(57) ABSTRACT

An apparatus and method controls power supplied from a powered HUB to a user terminal includes based on a vibration signal transmitted from the terminal. Initially, a connection between the HUB and terminal is determined to exist if at least one vibration signal is received from the terminal. Then, a determination is made as to when the signal is received. If received during a first check period, power is supplied from the HUB to the terminal. If received during a second check period, power continues to be supplied to the terminal. Power is cut-off when a number of vibration signals or vibration-signal events does not equal a predetermined number and the second check period transitions into the first check period. By taking these steps, the need to use specialized modules and communications protocols is eliminated, thereby reducing costs and system complexity.

21 Claims, 6 Drawing Sheets

- - - - - - ; Data
———— ; Data/power 1 and 2 : data transmission
3 and 6 : data reception
4 : vibration signal
5 : DC power
7 and 8 : GND

POWER CONTROL APPARATUS IN A DATA COMMUNICATION NETWORK, AND METHOD THEREFOR

BACKGROUND OF THE INVENTION

1. Field of the Invention

The present invention relates to a power control method in a data communication network.

2. Background of the Related Art

A data communication network may be described as a communication network which connects at least two computers for allowing a number of people to share data. Data communication networks typically include a local area network which connects adjacent computers at high speed and a wide area network having internal exchanges for connecting computers worldwide. Examples include a telephone network, a broadcasting network, and a computer communication network.

Data communication networks can be classified into a local area network (LAN), a wide area network (WAN), a value added network (VAN) and an integrated services digital network (ISDN) according to scale and function. A LAN is a narrow range communication network typically found in a place of business or in a building. The standard LAN includes Ethernet, Token Ring, and FDDI. The WAN is a wide area data transmission communication network which may include a few LANs. The VAN is a communication network added with a variety of information such as accumulation and supply of information, variations of a communication speed and format, and selection of a communication path. The ISDN is an integrated service digital communication network which collectively handles communication-related services such as a telephone, fax, data communication, videotex, etc.

Data communication networks often include a hub for connecting a plurality of terminals. The hub transmits downloaded data to a corresponding terminal, and uploaded data from the respective terminals to an external network through an Ethernet switch. Recently, a Powered-HUB has been proposed which can supply power to each terminal as well as transmit/receive data.

FIG. 1 is a diagram illustrating a related art Ethernet device. In this device, a Powered-HUB 13 receives data from an Ethernet switch 11, transmits the data to a user terminal, and supplies power to one of a plurality of user terminals which needs power. Here, the user terminals may include a web camera 19, an IP phone 21, and a wireless LAN access point 23. If desired, a personal computer 25 may be connected to the IP phone. The user terminals may be connected to the Powered-HUB 13 through unshielded twisted pair (UTP) cables 15 to 17 to supply data and power. Both ends of each UTP cables 15 to 17 may include RJ-45 jacks for establishing connection between the Powered-HUB and a respective user terminal. In general, Pins 1, 2, 3 and 6 of the RJ-45 jacks are used to transmit/receive data, and the other pins, namely pins 4, 5, 7 and 8, are used to supply power.

The above-described Ethernet device guarantees compatibility between the Powered-HUB and the user terminals. In this case, the Powered-HUB and the user terminals respectively have modules for confirming necessity of power and use a special protocol for mutual communication.

When the Powered-HUB and the user terminals are incompatible, external splitters must be positioned between user terminals 19, 21 and 23 and the Powered-HUB 13 as shown in FIG. 2. The external splitters are data/power splitters 27 to 29 for respectively branching data and power from the Powered-HUB, and transmitting them to each terminal through data only lines and power only lines.

The related art Ethernet device has a number of drawbacks. For example, the conventional Ethernet device requires a special module and protocol to supply power from the Powered-HUB to the user terminals. This increases the complexity of the entire system. Furthermore, in the case that the Powered-HUB and the user terminals are not compatible with each other, the data/power splitters must be installed between the Powered-HUB and the respective user terminals. This further complicates the system design and increases costs.

SUMMARY OF THE INVENTION

An object of the invention is to solve at least the above problems and/or disadvantages and to provide at least the advantages described hereinafter.

Accordingly, one object of the present invention is to provide a power control method in a data communication network which can supply power by using vibrators of each terminal.

It is another object of the present invention to provide a power control method in a data communication network which can control supply or switching of power according to vibration signals of vibrators.

The foregoing and other objects and advantages are realized by providing a power control method for deciding whether to supply power according to a vibration signal from a user terminal during a check period having a first check period for deciding whether to supply power and a second check period for deciding whether to keep supplying power.

The vibration signal is generated at predetermined intervals when a Powered-HUB and the user terminal are connected.

When the number of the vibration signals is identical to the number of setup signals during the first check period, power is supplied. In addition, when the number of the vibration signals is identical to the number of the setup signals during the second check period, power is continuously supplied. When the number of the vibration signals is not identical to the number of the setup signals during the second check period and the second check period is changed to the first check period at the same time, power is switched.

According to another aspect of the invention, a power control method in a data communication network includes: deciding whether to supply power by using a vibration signal from a user terminal during a first check period in a check period having a first check period of a low level and a second check period of a high level; deciding whether to keep supplying power by using the vibration signal from the user terminal during the second check period when the first check period is changed to the second check period; and switching power when the second check period is changed to the first check period in a state where whether to keep supplying power has not been decided during the second check period.

The step for deciding whether to supply power during the first check period includes the steps of: increasing a value of a clock counter according to detection of a rising event from the vibration signal; comparing a value of the clock counter with a setup value of the clock counter; and supplying power when the value of the clock counter is identical to the setup value of the clock counter.

The step for deciding whether to keep supplying power during the second check step includes the steps of: increasing a value of a connection counter according to detection of a rising event from the vibration signal; comparing a value of the connection counter with a setup value of the connection counter; and keeping supplying power when the value of the connection counter is identical to the setup value of the connection counter.

According to further another aspect of the invention, a power control method in a data communication network includes: receiving at least one vibration signal from a user terminal through an UTP cable; increasing a value of a clock counter and deciding whether the value of the clock counter is identical to a setup value of the clock counter, whenever a rising event of the vibration signal is detected from at least one vibration signal during a first check period for deciding whether to supply power; switching on a relay according to a power supply signal generated when the value of the clock counter is identical to the setup value of the clock counter; supplying power to the user terminal through the UTP cable when the relay is switched on; increasing a value of a connection counter and deciding whether the value of the connection counter is identical to a setup value of the connection counter, whenever a rising event of the vibration signal is detected from at least one vibration signal during a second check period for deciding whether to keep supplying power; maintaining the on state of the relay according to a power maintenance signal generated when the value of the connection counter is identical to the setup value of the connection counter; and continuously supplying power to the user terminal through the UTP cable when the relay is maintained on.

The power control method in a data communication network, further includes the steps of: switching off the relay according to a power switching signal generated when the number of the vibration signals is not identical to the number of the setup signals and the second check period is changed to the first check period; and stopping supplying power supplied to the user terminal when the relay is switched off.

According to still another aspect of the invention, a power control apparatus in a data communication network includes: a user terminal for transmitting at least one vibration signal generated when a UTP cable is connected thereto; a power control means for comparing the number of the vibration signals with the number of setup signals and outputting a control signal according to the comparison result during a check period having a first check period for deciding whether to supply power and a second check period for deciding whether to keep supplying power; a switching means for switching on/off a relay according to the control signal; and a power generating means for generating power supplied to the user terminal according to the on/off operation of the switching means.

The power control means includes: a clock counter for calculating the number of the vibration signals during the first check period; and a connection counter for calculating the number of the vibration signals during the second check period.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present a preferred embodiment of the invention in reference to the accompanying drawings.

Figure 1:
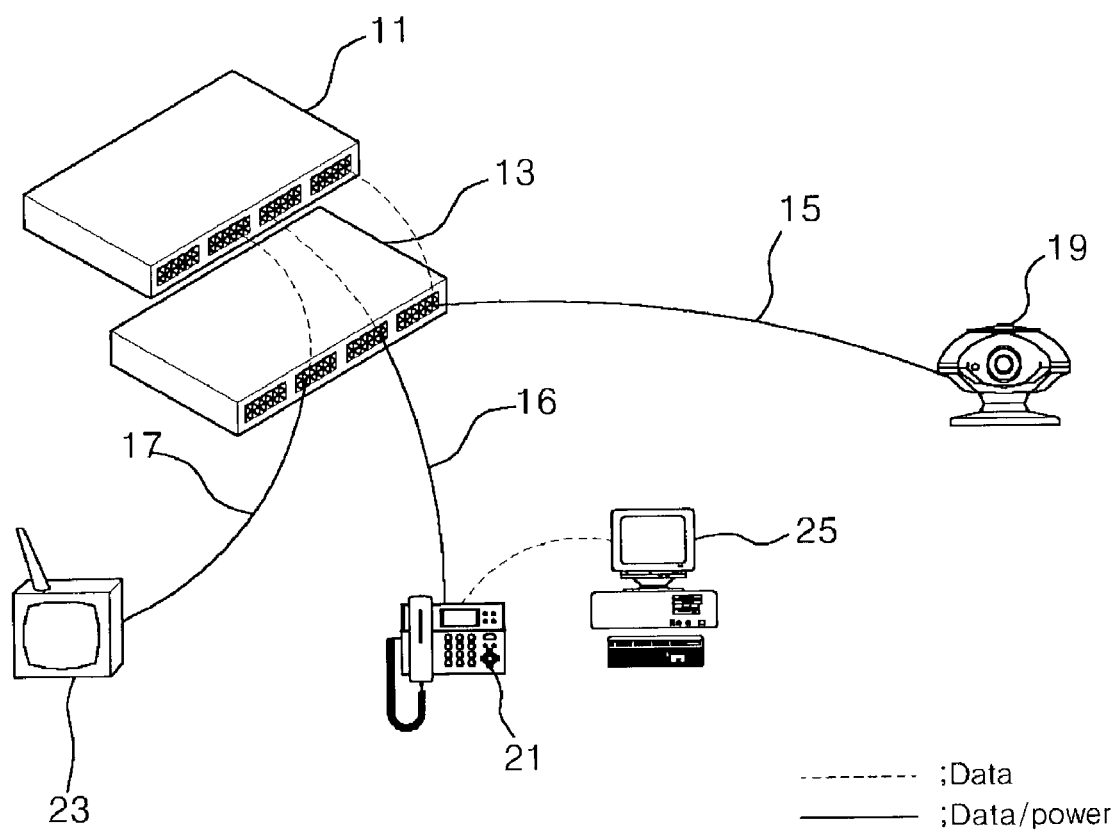
FIG. 1 is a view illustrating a related art Ethernet device.
Figure 2:
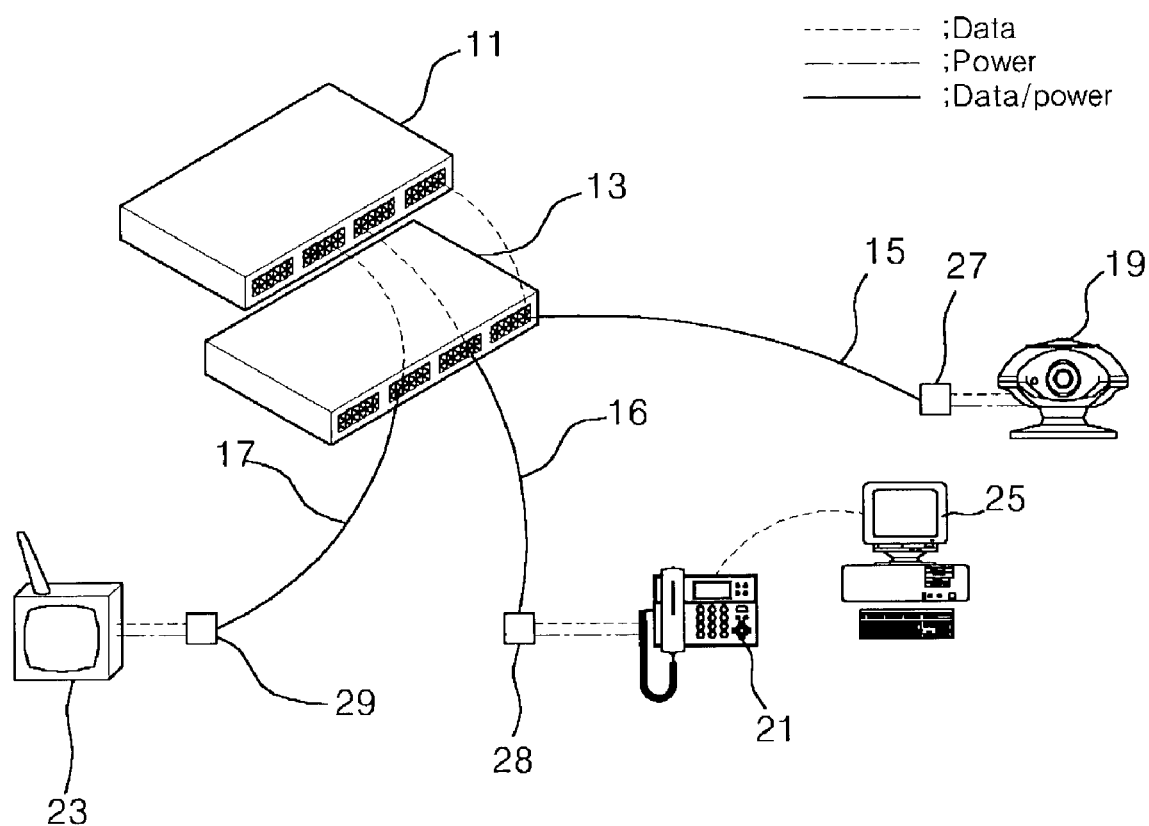
FIG. 2 is a view illustrating the related art Ethernet device in a state where a Powered-HUB and user terminals are not compatible.
Figure 3:
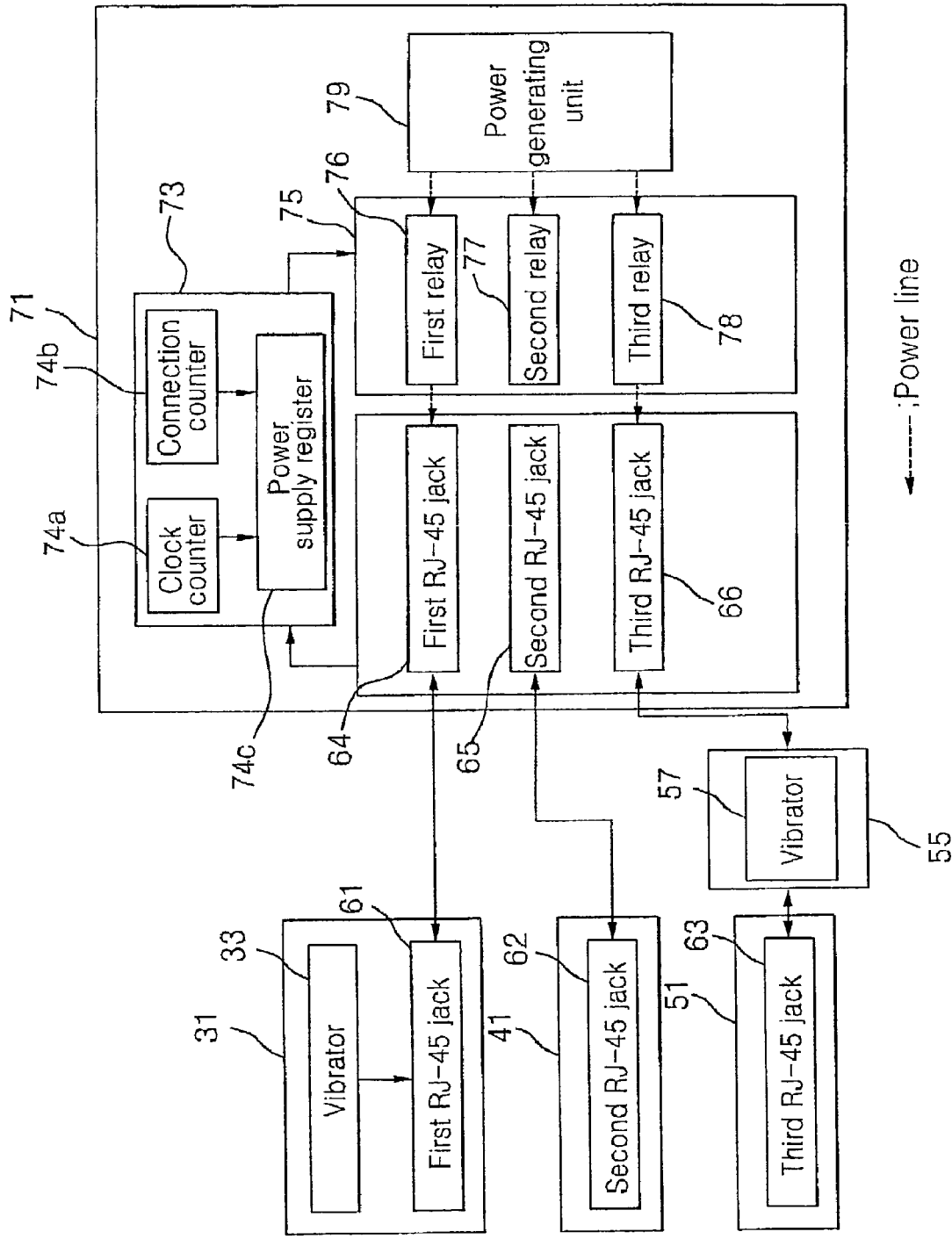
FIG. 3 is a structure view illustrating a power control apparatus in accordance with a preferred embodiment of the present invention.

FIG. 3 is a diagram showing a power control apparatus in accordance with one embodiment of the present invention. This apparatus includes a plurality of user terminals which request power supply when they need power, and Powered-HUB 71 which supplies power in response to the power supply request from the plurality of user terminals. Here, the plurality of user terminals are exemplified as a first terminal 31, a second terminal 41, and a third terminal 51. The first terminal 31 includes a vibrator 33 for generating a vibration signal used as a power supply request signal. Vibrator 33 generates the vibration signal when a UTP cable is connected thereto. That is, when the UTP cable is connected to the first terminal 31, the first terminal 31 drives vibrator 33 to generate the vibration signal. The second terminal 41 does not have a vibrator. Such a terminal uses a self-power source and thus does not need to receive power from the Powered-HUB 71. The third terminal 51 does not have a vibrator either. The third terminal 51 does not have a vibrator because it is not compatible with the Powered-HUB 71. In order to use a user terminal like terminal 51 which is not compatible with the Powered-HUB 71, an RJ-45 extension module 55 having a vibrator 57 for generating the vibration signal must be installed between the third terminal 51 and the Powered-HUB 71. When the RJ-45 extension module 55 is connected to the third terminal 51 or the Powered-HUB 71 through the UTP cable, the RJ-45 extension module 55 recognizes cable connection to the third terminal, and drives vibrator 57 to generate the vibration signal.

The UTP cable is a connection cable for requesting/supplying power as well as transmitting/receiving data. Preferably, it is positioned between the user terminal and the Powered-HUB 71. Both ends of the UTP cables have RJ-45 jacks 61 to 66 connected to the user terminals and the Powered-HUB. That is, one side RJ-45 jacks 61 to 63 of the UTP cables are connected to respective communication ports of the user terminals, and the other side RJ-45 jacks 64 to 66 are connected to respective communication ports of the Powered-HUB. Accordingly, each of the user terminals includes one communication port, but the Powered-HUB 71 includes as many communication ports as the plurality of user terminals to connect the user terminals.

Figure 4:
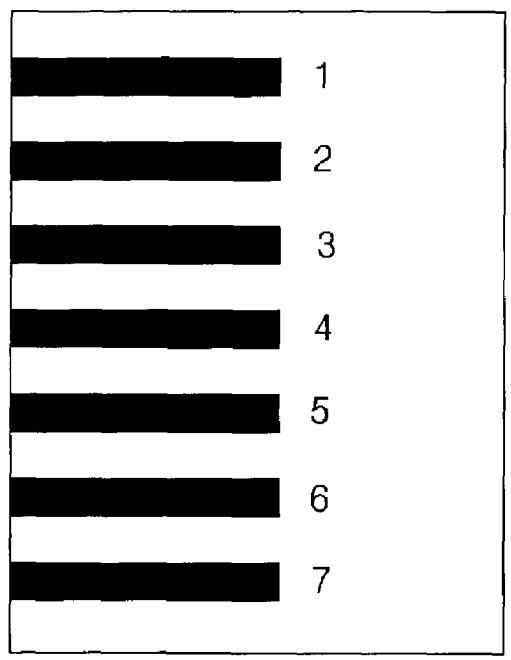
FIG. 4 is a structure view illustrating RJ-45 jack pins in accordance with the preferred embodiment of the present invention.

Referring to FIG. 4, the RJ-45 jacks 61 to 66 may include eight pins. Pins 1, 2, 3 and 6 may be used but the other pins 4, 5, 7 and 8 pins may not be used. In accordance with an example of the present invention, the unused pins (namely pins 4, 5, 7 and 8) can be employed to supply power. That is, pins 1 and 2 of the RJ-45 jacks 61 to 66 are used to transmit data, and pins 3 and 6 are used to receive data. In addition, pin 4 may be used for the vibration signal, pin 5 may be used for DC power, and pins 7 and 8 pins may be used for grounding. It is emphasized that the aforementioned pin numbers are merely illustrative and thus are not intended to be limiting of the present invention. If desired, the number of pins and/or pin assignments may be varied.

Referring to FIG. 3, the Powered-HUB includes a power control unit 73 for outputting a control signal for controlling power by using the vibration signal from the user terminal, a switching unit 75 for switching on/off a relay according to the control signal, and a power generating unit 79 for generating power to be supplied to the user terminal according to the on/off operation of the switching unit 75.

Figure 5:
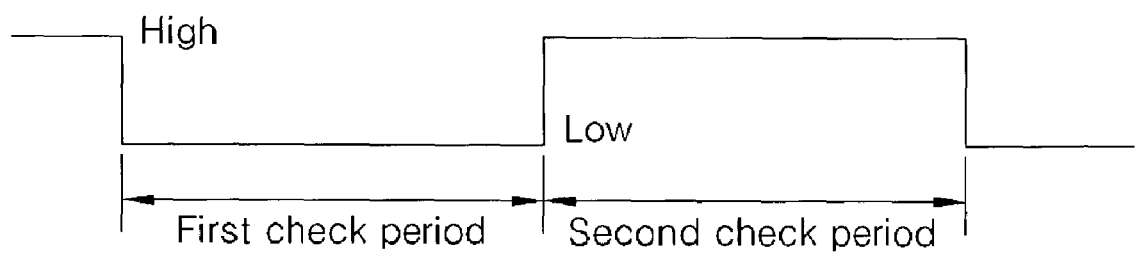
FIG. 5 is a view illustrating a check period for deciding whether to supply or keep supplying power in accordance with the preferred embodiment of the present invention.

The power control unit 73 is preferably a programmable logic device (PLD). A check period for deciding whether to supply or keep supplying power in each period may be implemented in the power control unit 73. As shown in FIG. 5, the check period may be divided into a first check period and a second check period. The first check period is a period for deciding whether to supply power, and the second check period is a period for deciding whether to keep supplying power. The first check period may have a check state of a low level and the second check period may have a check state of a high level.

The power control unit 73 may include a clock counter 74a, a connection counter 74b, and a power supply register 74c. Here, the clock counter counts a rising event detected from the vibration signal from the user terminal during the first check period, and the connection counter counts a rising event detected from the vibration signal from the user terminal during the second check period.

When the power control unit 73 checks the vibration signal from the user terminal during the first check period and decides to supply power, the power supply register is set up as '0'. Here, '0' indicates a power supply signal. When the power supply register is set up as '0', the power control unit 73 supplies the power supply signal, namely '0' to the switching unit 75. When a value of the clock counter counted by detecting the rising event from the vibration signal is identical to a setup value of the clock counter, power is supplied.

When the power control unit 73 checks the vibration signal from the user terminal during the second check period and decides to keep supplying power, the power supply register is not set up but maintained as it is. The power control unit 73 then supplies a power maintenance signal to the switching unit 75. When a value of the connection counter counted by detecting the rising event from the vibration signal is identical to a setup value of the connection counter, power is continuously supplied.

When the value of the connection counter is different from the setup value of the connection counter and the second check period is changed to the first check period, the power supply register is set up as '1'. Here, '1' indicates a power switching signal. When the power supply register is set up as '1', the power control unit supplies the power switching signal, namely '1' to the switching unit 75.

The switching unit may have as many relays 76, 77, 78 as the plurality of RJ-45 jacks connected to the plurality of communication ports of the Powered-HUB 71. Each of the relays of the switching unit is switched on/off according to the control signals from the power control unit, namely the power supply signal, power maintenance signal, and power switching signal.

On the other hand, a power generating unit 79 for generating power to be supplied through the relays can be formed at the front terminal of the switching unit 75. The power generating unit may generate a predetermined DC voltage (e.g., 48V).

As previously described, when the Powered-HUB receives the vibration signal from the user terminal, it confirms the check period, counts the number of the vibration signals by using the rising events of the vibration signals, compares the value of the counter with the setup value of the counter, decides whether to supply power, keeps supplying power or switches power, switches on/off the switching unit 75 according to the resultant control signal, and supplies power.

Figure 6:
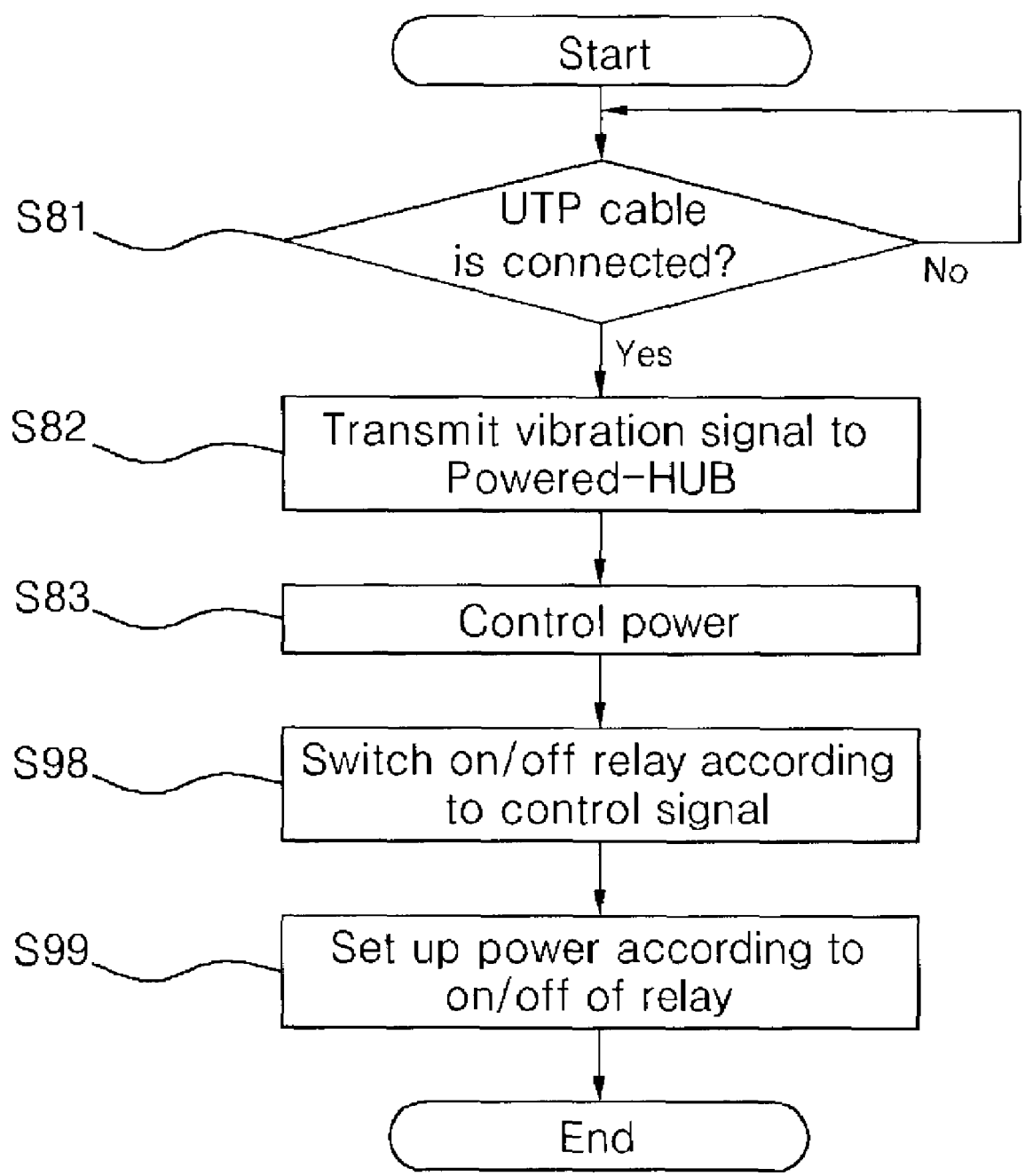
FIG. 6 is a flowchart showing a method for supplying power by the power control apparatus in accordance with the preferred embodiment of the present invention.

FIG. 6 is a flowchart showing steps included in a method for supplying power by the power control apparatus in accordance with the present invention. The method includes as an initial step confirming in the user terminal whether the UTP cable is connected thereto (step 81). Here, the user terminal has the vibrator for generating a vibration signal. As explained above, both ends of the UTP cable have RJ-45 jacks. One side jack of the UTP cable is connected to the user terminal, and the other side jack is connected to the Powered-HUB 71 or RJ-45 extension module 55. The UTP cable is also connected between the RJ-45 extension module 55 and the Powered-HUB 71. When the user terminal is not compatible with the Powered-HUB, the RJ-45 extension module transmits the vibration signal to the Powered-HUB through an internal vibrator, e.g., vibrator 57.

When it is determined that the UTP cable is connected to the user terminal, the user terminal recognizes the cable connection, drives the internal vibrator to generate the vibration signal, and transmits the vibration signal to the Powered-HUB through the UTP cable (step 82).

The Powered-HUB receives the vibration signal from the user terminal and performs a power control operation (step 83), which will now be explained in detail.

Figure 7:
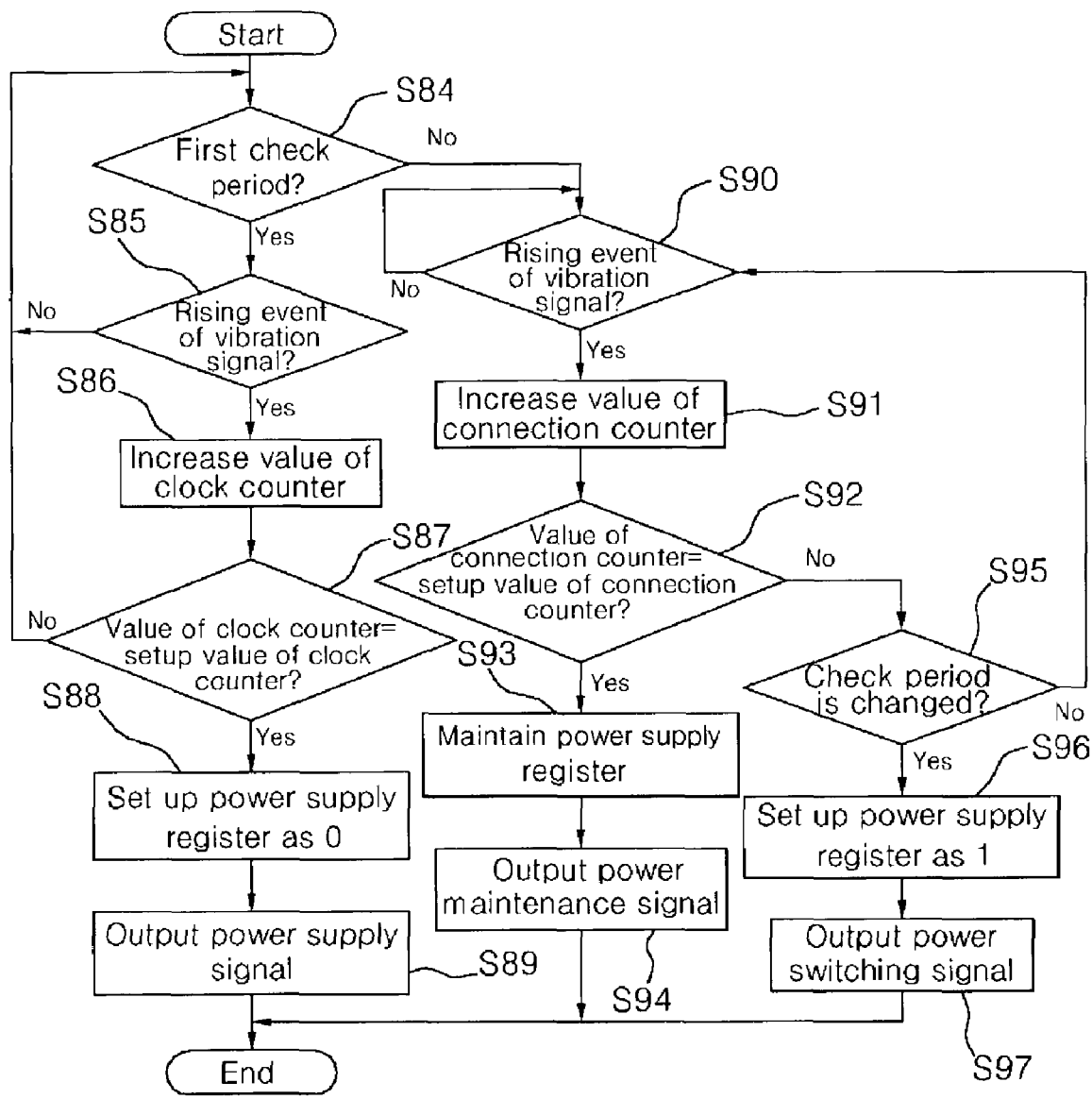
FIG. 7 is a flowchart showing a method for controlling power according to a vibration signal by a power control means of the power control apparatus in accordance with the preferred embodiment of the present invention.

FIG. 7 is a flowchart showing steps included in a method for controlling power according to the vibration signal by the power control unit of the power control apparatus in accordance with the present invention. As previously described, the check period for deciding whether to supply power or keep supplying power in each period exists in the Powered-HUB. That is, the check period is divided into the first check period and the second check period. Whether to supply power is decided during the first check period, and whether to keep supplying power is decided during the second check period. Referring to FIG. 7, the Powered-HUB 71 confirms whether the check period is the first check period or the second check period (step 84).

When the check period is the first check period, whether to supply power is decided. The power control unit 73 detects the rising event from the vibration signal from the user terminal (step 85). Here, the rising event indicates a jump portion from the low to high level in one vibration signal.

When the rising event is detected from the vibration signal, the value of the clock counter is increased (step 86). Preferably, the value of the clock counter is increased by '1' whenever the rising event is detected from the vibration signal. When the rising event is not detected, it implies that the vibration signal is not received. The power control unit 73 confirms reception of the vibration signal by confirming the check period.

The Powered-HUB 71 compares the increased value of the clock counter with the setup value of the clock counter (step 87). When the value of the clock counter is not identical to the setup value of the clock counter, the routine goes to step 84.

When the value of the clock counter is identical to the setup value of the clock counter, power supply is decided. The power control unit 73 sets up the power supply register as '0' (step 88). Here, '0' indicates the power supply signal.

The power supply unit 73 outputs the power supply signal to the switching unit 75 of FIG. 3 (step 89).

When the check period is not the first check period but the second check period, the power control unit detects the rising event from the vibration signal from the user terminal (step 90). When the rising event is detected from the vibration signal, the value of the connection counter is increased (step 91). Preferably, the value of the connection counter is increased by '1'.

The powered control unit 73 compares the value of the connection counter with the setup value of the connection counter (step 92). When the value of the connection counter is identical to the setup value of the connection counter, power is continuously supplied. The power control unit 73 does not set up the power supply register but maintains it as it is (step 93). Therefore, the power control unit 73 outputs the power maintenance signal to the switching unit 75 (step 94).

When the value of the connection counter is different from the setup value of the connection counter in step 92, the power control unit 73 confirms whether the check period is changed (step 95). That is, the power control unit 73 confirms whether the second check period is changed to the first check period.

When the check period is not changed, the routine goes to step 90 to detect the rising event from the succeeding vibration signal.

However, when the second check period is changed to the first check period, it implies that it does not exist in the period for deciding whether to keep supplying power. The power control unit 73 sets up the power supply register as '1' (step 96). Here, '1' indicates the power switching signal.

The power control unit 73 outputs the power switching signal set up in the power supply register to the switching unit 75 (step 97).

Still referring to FIG. 6, when the power control unit 73 controls power in step 83, whether to supply power and whether to keep supplying power are decided in each check period according to the rising event of the vibration signal, and the resultant signals, namely the power supply signal, power maintenance signal and power switching signal are outputted.

The control signal is inputted to the switching unit 75, and the switching unit 75 switches on/off the corresponding relay according to the control signal (step 98). That is, when the control signal from the control unit is the power supply signal, the switching unit 75 switches the relay on, when the control signal is the power maintenance signal, the relay is maintained on, and when the control signal is the power switching signal, the switching unit 75 switches the relay off.

Here, the relay corresponds to the UTP cable connected to the user terminal generating the vibration signal. That is, the UTP cable and the relay correspond to each other as explained above. Therefore, when the power supply signal is outputted in response to the vibration signal inputted to the Powered-HUB through a specific UTP cable among the plurality of UTP cables, the switching unit switches on the relay corresponding to the specific UTP cable, and power inputted through the relay is supplied to the user terminal connected to the UTP cable.

The power control unit sets up power generated in the power generating unit 79 according to the on/off state of the relay (step 99). That is, when the relay is switched on or maintained on, the power control unit 73 supplies power to the user terminal through the relay, and when the relay is switched off, power generated in the power generating unit 79 is not passed through the relay due to the off state of the relay, and thus not supplied to the user terminal.

On the other hand, when the UTP cable is connected to the user terminal which does not have the vibrator for generating the vibration signal like the second terminal 41 of FIG. 3, the Powered-HUB 71 does not receive the vibration signal, and thus the rising event of the vibration signal is not detected in step 85 or 90 of FIG. 7. Accordingly, whether to supply power or keep supplying power is not decided, and thus power is not supplied to the second terminal 41. In this case, the user terminal can receive power by using a self-power source or adapter.

As discussed earlier, in accordance with the present invention, the power control apparatus includes a vibrator for generating a vibration signal for reflecting the connection state of the UTP cable, thereby forming a simplified structure which does not require a special module. As a result, the structure of the network is simplified.

Moreover, the power control apparatus supplies power after deciding whether to supply or keep supplying power by using the vibration signal, and thus reduces power consumption as compared with when power is uniformly supplied to power/data splitters through the Powered-HUB. In addition, the RJ-45 extension module having the vibrator for generating the vibration signal is installed between the Powered-HUB and a user terminal which is not compatible with the Powered-HUB. Through this module, the application range of the power control apparatus may be substantially extended. As a result, the power control apparatus and the method of the present invention may be applied to any kind of network or system which needs to supply power to user terminals.

The foregoing embodiments and advantages are merely exemplary and are not to be construed as imitating the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for controlling power supplied from a Powered-HUB to a user terminal in a data communication network, comprising:

receiving at least one vibration signal from the user terminal; and deciding whether to supply power based on the vibration signal from the user terminal, wherein said deciding includes:

determining whether the vibration signal is received during a first check period or a second check period;

supplying power if the vibration signal is received during the first check period; and continuing to supply power if the vibrator signal is received during the second check period.

2. The method according to claim 1, wherein the vibration signal is generated at predetermined intervals when the Powered-HUB and the user terminal are connected.

3. The method according to claim 1, wherein, when a number of vibration signals is receieved, the power is supplied when said number of vibration signals is identical to a number of setup signals during the first check period.

4. The method according to claim 3, wherein the number of vibration signals corresponds to a number of rising events detected from the vibration signals.

5. The method of claim 3, wherein said number of vibration signals is greater than one.

6. The method according to claim 1, wherein, when a number of vibration signals is received, the power is continuously supplied when the number of vibration signals is identical to a number of the setup signals during the second check period.

7. The method according to claim 6, wherein the number of vibration signals corresponds to a number of rising events detected from the vibration signals.

8. The method according to claim 1, wherein power is switched when a number of vibration signals is received and the number of vibration signals is not identical to a number of the setup signals during the second check period, and the second check period is changed to the first check period at the same time.

9. The method according to claim 1, wherein the user terminal is one of an IP phone, web camera, and wireless LAN access point.

10. A method for controlling power supplied from a Powered-HUB to a user terminal in a data communication network, comprising:

deciding whether to supply power based on a vibration signal received from the user terminal during a first check period;

deciding whether to keep supplying power based on a vibration signal from the user terminal during a second check period, when the first check period is changed to the second check period; and switching power when the second check period is changed to the first check period in a state where whether to keep supplying power has not been decided during the second check period.

11. The method according to claim 10, wherein the step for deciding whether to supply power during the first check period, comprises: increasing a value of a clock counter according to detection of a rising event from the vibration signal;

comparing a value of the clock counter with a setup value of the clock counter; and supplying power when the value of the clock counter is identical to the setup value of the clock counter.

12. The method according to claim 10, wherein the step for deciding whether to keep supplying power during the second check step comprises:

increasing a value of a connection counter based on detection of a rising event from the vibration signal;

comparing a value of the connection counter with a setup value of the connection counter; and keeping supplying power when the value of the connection counter is identical to the setup value of the connection counter.

13. A method for controlling power supplied from a Powered-HUB to a user terminal in a data communication network, comprising:

receiving at least one vibration signal from the user terminal through an unshielded twisted pair (UTP) cable;

increasing a value of a clock counter and deciding whether the value of the clock counter is identical to a setup value of the clock counter, whenever a rising event of the vibration signal is detected from at least one vibration signal during a first check period for deciding whether to supply power;

switching on a relay according to a power supply signal generated when the value of the clock counter is identical to the setup value of the clock counter; and supplying power to the user terminal through the UTP cable when the relay is switched on.

14. The method according to claim 13, further comprising:

increasing a value of a connection counter and deciding whether the value of the connection counter is identical to a setup value of the connection counter, whenever a rising event of the vibration signal is detected from at least one vibration signal during a second check period for deciding whether to keep supplying power;

maintaining the on state of the relay according to a power maintenance signal generated when the value of the connection counter is identical to the setup value of the connection counter; and continuously supplying power to the user terminal through the UTP cable when the relay is maintained on.

15. The method according to claim 14, further comprising:

switching off the relay based on a power switching signal generated when a number of the vibration signals is not identical to a number of the setup signals and the second check period is changed to the first check period; and stopping supplying power supplied to the user terminal when the relay is switched off.

16. A power control apparatus in a data communication network, comprising:

a user terminal which transmits a number of vibration signals generated when connected to unshielded twisted pair (UTP) cable;

a power control unit compares the number of vibration signals with a number of setup signals and outputs a control signal based on a comparison result during a check period having a first check period for deciding whether to supply power and a second check period for deciding whether to keep supplying power;

a unit which switches on/off a relay according to the control signal; and a power generating unit which generates power supplied to the user terminal according to the on/off operation of the switching unit.

17. The device according to claim 16, wherein, when the number of the vibration signals is identical to the number of setup signals during the first check period, the control signal is a power supply signal.

18. The device according to claim 16, wherein, when the number of the vibration signals is identical to the number of the setup signals during the second check period, the control signal is a power maintenance signal.

19. The device according to claim 16, wherein, when the number of the vibration signals is not identical to the number of the setup signals during the second check period and the second check period is changed to the first check period at the same time, the control signal is a power switching signal.

20. The device according to claim 16, wherein the power control unit comprises a clock counter for calculating the number of the vibration signals during the first check period.

21. The device according to claim 16, wherein the power control unit comprises a connection counter for calculating the number of the vibration signals during the second check period.

* * * * *